United States Patent Office 3,740,437
Patented June 19, 1973

3,740,437
NAPHTHYLOXYACETIC ACIDS AND PHARMA-
CEUTICAL COMPOSITIONS AND METHODS
THEREOF
Ian T. Harrison and John H. Fried, Palo Alto, Calif.,
assignors to Syntex Corporation, Panama, Panama
No Drawing. Continuation-in-part of abandoned applica-
tion Ser. No. 608,970, Jan. 13, 1967. This application
June 25, 1970, Ser. No. 49,967
Int. Cl. A61k 27/00
U.S. Cl. 424—317                    3 Claims

ABSTRACT OF THE DISCLOSURE

Naphthyloxyacetic acids having optional substitution in the ring carbons and the α carbon of the acetic acid moiety and the corresponding amide, ester, and addition salts thereof which compounds are useful as anti-inflammatory, analgesic, antipyretic and antipruritic agents as well as fibrinolytic and hypocholesterolemic agents. The compounds per se and pharmaceutical compositions incorporating, and pharmaceutical methods employing these compounds are disclosed.

---

This is a continuation-in-part of application Ser. No. 608,970, filed Jan. 13, 1967, now abandoned.

This invention relates to naphthyloxyacetic acids and derivatives thereof, compositions containing, and methods utilizing these compounds as anti-inflammatory, analgesic, antipyretic, antipruritic, fibrinolytic and hypocholesterolemic agents.

The naphthyloxyacetic acids and derivatives thereof can be represented by the following Formula A:

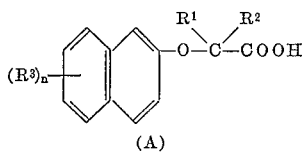

(A)

wherein one of $R^1$ and $R^2$ is hydrogen, the other being hydrogen, alkyl, cycloalkyl, haloalkyl, aryl, or aralkyl;
$R^3$ is hydrogen, hydroxy, acyloxy, tetrahydrofuran-2-yloxy, tetrahydropyran-2-yloxy, chloro, fluoro, alkyl, haloalkyl, cycloalkyl, alkyloxy, haloalkyloxy, aryl, or aralkyl;
$n$ is the integer 1, 2, or 3; and
the corresponding amide, ester, hydroxamic acid, and pharmaceutically acceptable acid addition salts thereof.

The present invention is especially directed to certain, novel compounds selected from those depicted and defined by the above Formula A. These preferred compounds are represented by the following formulas:

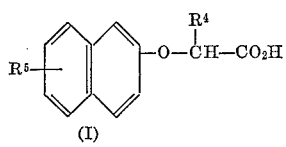

(I)

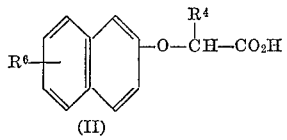

(II)

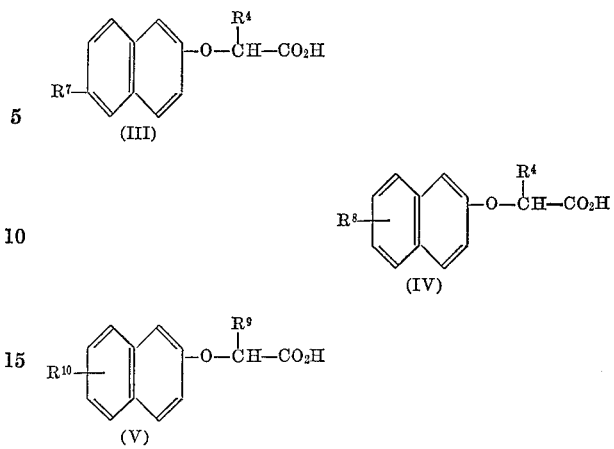

wherein, in each applicable formula, $R^4$ is lower alkyl;
$R^5$ is carboxylic acyloxy of less than 12 carbon atoms, tetrahydropyran-2-yloxy, or tetrahydrofuran-2-yloxy;
$R^6$ is lower alkyl of 2 to 6 carbon atoms;
$R^7$ is hydroxy or lower alkyloxy;
$R^8$ is haloloweralkyl, haloloweralkyloxy, or phenyl;
$R^9$ is cycloalkyl or phenyl; and
$R^{10}$ is hydrogen, hydroxy, carboxylic acyloxy of less than 12 carbon atoms, tetrahydropyran-2-yloxy, tetrahydrofuran-2-yloxy, chloro, fluoro, lower alkyl, haloloweralkyl, cycloalkyl, lower alkyloxy, haloloweralkyloxy, or phenyl;
the corresponding amide, ester, hydroxamic acid, and pharmaceutically acceptable acid addition salts thereof.

Preferred are those compounds of Formulas I to V wherein $R^4$ is methyl. Further preferred are those compounds of the foregoing of Formulas I, II, IV, and V wherein the $R^5$, $R^6$, $R^8$, and $R^{10}$ substituent, respectively, is attached to the C-6 carbon atom. Further preferred are those compounds of the foregoing of Formula IV wherein $R^8$ is trifluoromethyl or difluoromethoxy, and those compounds of the foregoing of Formula V wherein $R^{10}$ is hydrogen, hydroxy, chloro, fluoro, methyl, trifluoromethyl, methoxy, or difluoromethoxy.

The present invention, in a second aspect, is especially directed to a novel pharmaceutical composition comprising an effective therapeutic amount of a compound of the formula

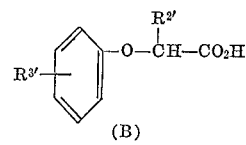

(B)

wherein $R^{2'}$ is lower alkyl, cycloalkyl, or phenyl; and
$R^{3'}$ is hydrogen, hydroxy, carboxylic acryloxy of less than 12 carbon atoms, tetrahydropyran-2-yloxy, tetrahydrofuran-2-yloxy, chloro, fluoro, lower alkyl, haloloweralkyl, cycloalkyl, lower alkyloxy, haloloweralkyloxy, or phenyl;
the corresponding amide, ester, hydroxamic acid, and pharmaceutically acceptable acid addition salts thereof; and
a pharmaceutically acceptable non-toxic carrier.

The present invention, in a third aspect, is especially directed to a novel pharmaceutical method comprising administering to an animal an effective therapeutic dose of a pharmaceutical composition as above defined or a compound of Formula B above.

The above composition and method hereof are preferably practiced using an active compound selected from those of Formulas I to V above.

The compounds and pharmaceutical compositions hereof when administered in accordance with the method hereof are useful for anti-inflammatory, analgesic, anti-pyretic, anti-pruritic, fibrinolytic, and hypocholesterolemic activity.

In the practice of this use, the compounds of the present invention, or compositions thereof, can be administered to an animal via any of the usual and accepted methods known in the art, whether parenterally or orally, either singly or in combination with other compounds of this invention or other pharmaceutical agents such as antibiotics, hormonal agents, etc. The administration can be conducted in single unit dosage form for continuous therapy or in single dose therapy. In view of the foregoing as well as in consideration of the degree or severity of the condition being treated, age of patient, and so forth, all of which factors being determinable by one skilled in the art; the dosage can vary over a wide range. Generally, a therapeutic effective amount ranges from about 0.1 to about 60 and preferably from about 1 to about 20 mg./kg. of body weight per day.

The pharmaceutical compositions will contain the active compound together with a solid or liquid pharmaceutically acceptable non-toxic carrier. Such pharmaceutical carriers can be sterile liquids such as water and oils including those of petroleum, animal, vegetable, or synthetic origin, for example, peanut oil, soybean oil, mineral oil, sesame oil, and the like. Water, saline, aqueous dextrose and glycerols are preferred liquid carriers particularly for injectable solutions. Suitable pharmaceutical excipients include starch, glucose, lactose, sucrose, gelatin, malt, rice, flour, chalk, silica gel, magnesium carbonate, magnesium stearate, sodium stearate, glyceryl monostearate, talc, sodium chloride, dried skim milk, glycerol, propylene glycol, water, ethanol and the like. These compositions take the form of solutions, suspensions, tablets, pills, capsules, powders, sustained release formulations, and the like. Suitable pharmaceutical carriers are described in "Remington's Pharmaceutical Sciences" by E. W. Martin. Such compositions will contain an effective therapeutic amount of the active compound together with a suitable amount of carrier so as to prepare the preferred dosage form for proper administration to the host. Generally, such compositions will contain from about 1.0 to about 90 and preferably from about 20 to about 50 percent by weight of the active compound.

The above compounds have high therapeutic value in the treatment of various inflammatory conditions, such as of the skin, eyes, respiratory tract, bones, and internal organs, contact dermatitis, allergic reactions, and rheumatoid arthritis. In those cases in which the above conditions include pain, fever, and itching, coupled with the inflammation, the instant compounds are useful for relief of these associative conditions as well as the principal. The instant compounds are in addition, however, useful for treating pain, fever, itching and other syndromes thereof per se, such as those arising from bone fracture, toothache, bacterial and virus infection, contact with poisonous material, neuralgia, neuritis, lacerations, contusions, abrasions, and the like. Anti-inflammatory activity can be measured according to the Carrageenin Induced Edema Assay of Winter et al., Proceedings of the Society for Experimental Biology and Medicine, 111, 544 (1962).

The compounds of the present invention are also (1) hypocholesterolemic agents and (2) fibrinolytic agents. They are thus useful for (1) lowering serum cholesterol levels, and (2) the treatment of thromboembolic conditions by lysing preformed fibrin. They are administered in such activities as described above.

The compounds of the present invention are prepared by reacting together a naphthol corresponding to the formula

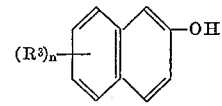

wherein each of $R^3$ and $n$ is as defined above, and a halo compound of the following formula

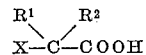

wherein each of $R^1$ and $R^2$ is as defined above and X is halo, preferably bromo, and base, preferably an alkali metal hydroxide.

The reaction is preferably conducted in aqueous reaction media although inert liquid organic reaction media can be employed as co-media. The reaction is further conducted at temperatures ranging from about 50° C. to about 100° C. and for a period of time sufficient to complete the reaction ranging from about two hours to about forty-eight hours.

The reaction consumes the reactants on the basis of one mole of naphthol compound per mole of halo compound per two moles of base. However, the amounts of the reactants to be employed are not critical, some of the desired naphthyloxy products being obtained when employing any proportions thereof. In the preferred embodiments, the reaction is conducted by reacting from about 1 to about 10 moles of the halo compound and from about 2 to about 10 moles of base per mole of starting naphthol compound.

In the practice of this step, the reactants are contacted and maintained together in any convenient order or fashion and within the given temperature range for a period of time sufficient to produce product. Following the reaction, the product can be separated and isolated via any of the known conventional techniques such as decantation, filtration, extraction, evaporation, distillation, and chromatography.

With those starting compounds containing two hydroxy groups, one equivalent of halo compound is preferably employed. The mono addition product can be isolated such as by chromatography. The remaining hydroxy group is then conventionally etherified or esterified, as desired, such as with dihydrofuran and dihydropyran to form the ethers and with carboxylic acid anhydrides to form the esters.

Upon their preparation, the product naphthyloxyacetic acid derivatives can be converted to the corresponding amide, ester, hydroxamic acid and pharmaceutically acceptable acid addition salts thereof as described above.

Tablets can be prepared, for example, by mixing 75 mg. of 2-naphthyloxy propionic acid and 175 mg. of cornstarch and pressing the mix into single scored tablets, one tablet being administered orally every three to four hours. Similarly, 200 mg. of 6-methoxy-2-naphthylacetic acid, 50 mg. of cornstarch, 100 mg. of lactose, and 1 gm. of magnesium stearate are mixed intimately and pressed into single scored tablets. Further, 150 mg. of 2-naphthyloxypropionic acid and 150 mg. of cornstarch are mixed and introduced into a #1 hard shell gelatin capsule.

Unit capsules are prepared for oral administration by filling standard two piece hard gelatin capsules weighing about 25 mg. each with 125 mg. of 6-methoxy-2-naphthyloxy-α-methyl acetic acid, 125 mg. of lactose and 1 mg. of finely divided silica. Unit capsules can also be prepared for oral administration by filling soft gelatin capsules with a solution of a compound of the present invention in mineral oil. Tablets are prepared by conventional procedures such that a dosage unit is 10 mg. of active agent, 5 mg. of gelatin, 1.5 mg. of magnesium stearate, and 100 mg. of lactose. By coating these capsules, slow release can be obtained.

The starting naphthol compounds are known and they can be prepared by methods known per se. For example, the R³=cycloalkyl, lower alkyl, lower alkoxy and phenyl compounds can be prepared by acetylation of the appropriately R³ substituted naphthalene with acetyl chloride in nitrobenzene in the presence of about three equivalents of aluminum chloride at about 25° C. for 48 hours following by treating the acetyl compound with m-chloroperbenzoic acid in chloroform at reflux for about 24 hours to afford the compound of the formula

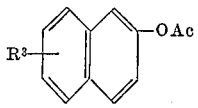

This compound is conventionally base hydrolyzed to the corresponding 2-naphthol and this treated as above described to form the compounds of the present invention, particularly those wherein R³ is cycloalkyl, lower alkyl, lower alkoxy, and phenyl.

The R³=trifluoromethyl compounds can be prepared by treating the R³=H, 2-naphthyloxyacetic acid compounds containing a ring bromo or iodo group (prepared as described above from bromo- or iodo-naphthylene) with two equivalents of iodotrifluoromethane, about 10 ml./g. of halo naphthalene compound, and about ten equivalents of copper powder at about 140° C. in a sealed tube for about 24 hours.

The R³=difluoromethoxy compounds hereof can be prepared by treating the R³=hydroxy compounds in sodium hydroxide, water, and dioxane (1:4:4) with chlorodifluoromethane at 60° C. for about 2 hours.

The R²=cycloalkyl compounds can be prepared by esterifying a 2-naphthyloxyacetic acid hereof and treating the latter with cycloalkyl bromide and sodium hydride in monoglyme at 50° C. for 24 hours. Hydrolysis, if desired, reproduces the acid.

With regard to the preparation of the compounds hereof as described above, the details of copending application Ser. No. 694,771, filed Dec. 7, 1967, by Harrison and Fried is hereby incorporated by reference.

The halo acid starting compounds are known and they can be prepared by methods known per se.

By the term "lower alkyl," unless otherwise qualified, is meant a branched or straight chain acyclic aliphatic hydrocarbon of 1 to 6 carbon atoms, and 1 to 2 to 3 . . . to 6 and 1 and 2 and 3 . . . and 6 carbon atoms such as methyl, ethyl, propyl, butyl, pentyl, hexyl, the various isomers thereof. "Lower alkoxy" is "lower alkyl O," "lower alkyl" being as defined above. "Cycloalkyl" is a cyclic aliphatic hydrocarbon of 3 to 6 carbon atoms, cyclopropyl, cyclobutyl, cyclopentyl, and cyclohexyl. The term "haloloweralkyl" includes polychloro-, and polyfluoroalkyl groups, particularly polychloro- and polyfluoro-methyl, such as dichloromethyl, difluoromethyl, trifluoroethyl, trichloromethyl, and preferably trifluoromethyl. The term "haloloweralkyloxy" is "haloloweralkyl O," "haloloweralkyl" being as defined above, preferably difluoro-methoxy. The term "carboxylic acyloxy of less than 12 carbon atoms" refers to a group derived from a conventional hydrocarbon carboxylic acid which contains less than 12 carbon atoms and may be of a straight, branched, acyclic or cyclic, aliphatic chain structure. They may be saturated, unsaturated, or aromatic and optionally substituted by functional groups, such as hydroxy, nitro, amino, halogen, and the like. Typical conventional esters thus include acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-β,β-dimethylglutarate, acetocyacetate, 2-chloro-4-nitrobenzoate, aminoacetate, diethylaminoacetate, piperidinoacetate, β-chloropropionate, trichloroacetate, β-chlorobutyrate, and the like.

The corresponding amide, ester, hydroxamic acid and pharmaceutically acceptable acid addition salts of the present invention are conventionally prepared.

The amides of the present novel compounds are prepared from conventional bases, such as ammonia, methylamine, ethylamine, methylethylamine, dimethylamine, diethylamine, pyrrolidine, piperidine, piperazine, N-ethylpiperazine, morpholine, di(methoxymethylene)amine, isopropylamine, aniline, N-methyl-N-cyclopentylamine, and the like. The amides are prepared by conventional means known to the art, for example, by treating the naphthyloxyacetic acid derivative with thionyl chloride, phosphorus pentachloride, and the like, and then treating the resulting acid chloride of the nephthyloxyacetic acid derivative with an excess of ammonia or an amine.

The esters are also prepared by conventional techniques such as by preparing the acid chloride of the 2-naphthyloxyacetic acid derivative and then alowing the acid chloride to react with an alkanol, such as methanol, ethanol, and the like; or by treating the 2-naphthyloxyacetic acid derivative with a diazoalkane, for example, diazomethane, diazoethane, and the like; or with an alkanol of 1 to 12 carbon atoms, for example, methanol, ethanol, butanol, or 3-pentanol, in the presence of an acid catalyst such as borontrifluoride, p-toluenesulfonic acid, or the like.

The hydroxamic acid derivatives are prepared by treating the 2-naphthyloxyacetic acid ester derivatives with hydroxyamine (usually as the hydrochloride salt) in the presence of base, such as sodium methoxide, in an alkanol solvent, such as methanol, ethanol, and the like.

The addition salts are prepared by conventional techniques from pharmaceutically acceptable non-toxic bases, including metal salts such as sodium, potassium, calcium, aluminum, and the like, as well as organic amine salts, such as triethylamine, 2-dimethylamnio ethanol, 2-diethylamino ethanol, lysine, argine, histidine, caffeine, procaine, N-ethylpiperidine, hydrabamine, and the like.

Representative compounds of the present invention include:

2-naphthyloxy-α-methylacetic acid,
2-naphthyloxy-α-dichloromethylacetic acid,
2-naphthyloxy-α-difluoromethylacetic acid,
2-naphthyloxy-α-trifluoromethylacetic acid,
2-naphthyloxy-α-cyclohexylacetic acid,
2-naphthyloxy-α-cyclobutylacetic acid,
2-naphthyloxy-α-ethylacetic acid,
2-naphthyloxy-α-hexylacetic acid,
2-naphthyloxy-α-trifluoroethylacetic acid,
2-naphthyloxy-α-phenylacetic acid,
2-naphthyloxy-α-benzylacetic acid,
2-naphthyloxy-α-phenethylacetic acid,
2-naphthyloxy-α-isopropylacetic acid,
2-naphthyloxy-α-sec-butylacetic acid,
4-isopropyloxy-2-naphthyloxypropionic acid,
8-isopropoxy-2-naphthyloxypropionic acid,
6-trichloroethoxy-2-naphthyloxypropionic acid,
6-phenyl-2-naphthyloxypropionic acid,
6-benzyl-2-naphthyloxypropionic acid,
1-chloro-2-naphthyloxyacetic acid,
3-hydroxy-2-naphthyloxyacetic acid,
7-chloro-2-naphthyloxyacetic acid,
4-acetoxy-2-naphthyloxyacetic acid,
6-methyl-2-naphthyloxyacetic acid,
5-pentanoyloxy-2-naphthyloxyacetic acid,
6-ethyl-2-naphthyloxyacetic acid,
6-benzyloxy-2-naphthyloxyacetic acid,
5-methoxy-2-naphthyloxy-α-methylacetic acid,
7-trimethylacetoxy-2-naphthyloxy-α-methylacetic acid,
6-chloro-2-naphthyloxy-α-ethylacetic acid,
8-propionyloxy-2-naphthyloxy-α-ethylacetic acid,
6-fluoro-2-naphthyloxy-α-methylacetic acid,
1-tetrahydropyran-2'-yloxy-2-naphthyloxy-α-methylacetic acid, 6-methyl-2-naphthyloxy-α-pentylacetic acid,
4-tetrahydrofuran-2'-yloxy-2-naphthyloxy-α-pentylacetic acid,
6-ethyl-2-naphthyloxy-α-methylacetic acid,
6-fluoro-2-naphthyloxy-α-methylacetic acid,
6-isopropyl-2-naphthyloxy-α-cyclopentylacetic acid,
5-difluoroethyl-2-naphthyloxy-α-cyclopentylacetic acid,
6-trifluoromethyl-2-naphthyloxy-α-methylacetic acid,
7-trichloromethyl-2-naphthyloxy-α-methylacetic acid,
6-methoxy-2-naphthyloxy-α-trifluoromethylacetic acid,
8-cyclohexyl-2-naphthyloxy-α-trifluoromethylacetic acid,
6-ethoxy-2-naphthyloxy-α-phenylacetic acid,
4-cyclobutyl-2-naphthyloxy-α-benzylacetic acid, and
6-difluoromethoxy-2-naphthyloxy-α-methylacetic acid.

The following examples serve merely to further illustrate the present invention.

EXAMPLE 1

Ten grams of 2-naphthol is treated with three equivalents of sodium hydroxide in 100 ml. of water. One equivalent of 2-chloropropionic acid is added and the mixture is stirred at 90° C. for 24 hours. The reaction mixture is thereafter acidified by the addition of acid. The acidified solution is filtered giving 2-naphthyloxy-α-methylacetic acid which can be recrystallized from methanol.

The above procedure can be utilized with both ring substituted 2-naphthols, and α-substituted haloacetic acids, including the 2-bromo derivatives thereof, to obtain the corresponding naphthyloxyacetic acid products.

EXAMPLE 2

To a mixture of 5 equivalents of potassium hydroxide in 100 ml. of water are added 10 g. of 6-benzyloxy-2-naphthol. To the resultant mixture are added 5 equivalents of 2-bromobutyric acid in a portionwise fashion with stirring. Stirring is continued while the reaction mixture is thereafter heated to 60° C. for 48 hours. After this time, the reaction mixture is cooled, acidified, and filtered to give the 6-benzyloxy-2-naphthyloxy-α-ethylacetic acid product.

EXAMPLE 3

A mixture of 10 g. of 6-benzyloxy-2-naphthyloxy-α-ethylacetic acid is stirred under a hydrogen atmosphere with 200 mg. of 5% palladium-on-charcoal catalyst in 100 ml. of ethanol for one hour. The mixture is thereafter filtered, the filtrate being evaporated yielding 6-hydroxy-2-naphthyloxy-α-ethylacetic acid.

EXAMPLE 4

A mixture of 1 g. of 6-hydroxy-2-naphthyloxy-α-ethylacetic acid, 1 g. of p-toluenesulfonic acid monohydrate, 50 ml. of acetic acid and 25 ml. of acetic anhydride is allowed to stand at room temperature for 24 hours, and then is poured into water and stirred. This mixture is then extracted with methylene chloride and these extracts are dried and evaporated to yield 6 - acetoxy - 2 - naphthyloxy-α-ethylacetic acid, which is recrystallized from acetone:ether.

In a similar manner, the other ring substituted carboxylic acyloxy compounds can be prepared upon substitution of the appropriate acylating agent in the foregoing procedure.

EXAMPLE 5

Two milliliters of dihydropyran are added to a solution of 1 g. of 6-hydroxy-2-naphthyloxy-α-ethylacetic acid in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on silica gel to yield 6-tetrahydropyran-2'-yloxy-2-naphthyloxy-α-ethylacetic acid, which may be further purified via recrystallization from acetone:hexane.

Upon substituting dihydrofuran for dihydropyran in the foregoing procedure, there is obtained the 6-tetrahydrofuran-2'-yloxy - 2 - naphthyloxy-α-ethylacetic acid product.

EXAMPLE 6

A solution of one chemical equivalent of 6-hydroxy-2-naphthyloxyacetic acid in 30 ml. of benzene is heated to reflux and about 2 ml. removed by distillation to eliminate moisture. The mixture is cooled to room temperature and two chemical equivalents of sodium hydride are added, followed by the dropwise addition of five chemical equivalents of cyclopentyl bromide. The mixture is allowed to reflux for 20 hours. A 5% sodium hydroxide in ethanol solution is then added. The resultant mixture is acidified and the acidified mixture extracted with ether. The ether extracts are dried and evaporated to yield 6-cyclopentyloxy-2-naphthyloxyacetic acid which is further purified upon recrystallization from pentane.

Use of cyclohexyl bromide above yields 6-cyclohexyloxy-2-naphthylacetic acid.

EXAMPLE 7

A mixture of 1 g. of 6-hydroxy-2-naphthyloxyacetic acid in 25 ml. of diglyme is heated to 150° C. Over a period of 1 hour, 10 g. of sodium difluorochloroacetate in 50 ml. of diglyme are added. The mixture is thereafter cooled, filtered from sodium chloride and evaporated. The residue is dissolved in ether and the ether solution washed with water and evaporated giving 6-difluoromethoxy-2-naphthyloxyacetic acid.

EXAMPLE 8

A solution of 10 g. of 6-methyl-2-naphthyloxyacetic acid in 500 ml. of methanol is treated with 10 ml. of methanol which is saturated with hydrochloric gas. After maintaining this treatment for 6 hours at 20° C., the solution is evaporated providing methyl 6-methyl-2-naphthyloxyacetate.

To a mixture of 22 g. of methyl 6-methyl-2-naphthyloxyacetate, 2.5 g. of sodium hydride and 150 ml. of 1,2-dimethoxyethane, 25 g. of methyliodide are added. The reaction mixture is allowed to stand for several hours; then it is diluted with ethanol followed by water and extracted with methylene chloride. The extracts are combined, washed with water to neutrality, dried over sodium sulfate, filtered, and evaporated to yield methyl 6-methyl-2-naphthyloxy-α-methylacetate.

In a similar manner, the α-cycloalkyl compounds are prepared.

EXAMPLE 9

Chlorine gas is bubbled through a mixture of 23 g. of methyl 6-methyl-2-naphthyloxy-α-methylacetate and 1 g. of phosphorus pentachloride in 200 ml. of carbon tetrachloride in the presence of light until 21.3 g. of chlorine have been taken up. The reaction mixture is diluted with 200 ml. of pyridine, filtered, further diluted with 500 ml. of ether, washed with water to neutrality, dried over sodium sulfate, and evaporated to yield methyl 6-trichloromethyl-2-naphthyloxy-α-methylacetate. The above product is then refluxed in a mixture of 500 ml. of chlorobenzene and 17.9 g. of antimony-trifluoride. The cooled reaction mixtue is washed with water, dried over sodium sulfate, and evaporated to yield methyl 6-trifluoromethyl-2-naphthyloxy-α-methylacetate.

Similarly, methyl 8-trifluoromethyl-2-naphthyloxyacetate, methyl 1-methoxy-6-trifluoromethyl-2-naphthyloxy-α-ethylacetate, methyl 6-trifluoromethyl - 2 - naphthyloxyacetate can be perpared by this method.

The following examples illustrate procedures by which the acid products hereof are further elaborated.

EXAMPLE 10

A suspension of 2.4 g. of sodium hydride and 50 ml. of benzene is added to a mixture of 23 g. of 6-fluoro-2- naphthyloxy-α-methylacetic acid and 450 ml. of benzene. The resulting mixture is stirred for four hours. The mixture is cooled to 0° C. and 19 g. of oxalyl chloride are added; after the addition, the mixture is allowed to stand for four hours. The resulting mixture is then saturated with ammonia and allowed to stand for eight hours. This mixture is then evaporated under reduced pressure. The residue is taken up in methylene chloride, washed with water to neutrality, dried, filtered, and evaporated to give 6-fluoro-2-naphthyloxy-α-methylacetamide.

Similarly,

N-methyl-6-fluoro-2-naphthyloxy-α-methylacetamide,
N,N-dimethyl-6-fluoro-2-naphthyloxy-α-methylacetamide,
N-ethyl-6-fluoro-2-naphthyloxy-α-methylacetamide,
N,N-diethyl-6-fluoro-2-naphthyloxy-α-methylacetamide,
6-fluoro-2-naphthyloxy-α-methyl N-acetyl pyrrolidine,
6-fluoro-2-naphthyloxy-α-methyl N-acetyl piperidine,
6-fluoro-2-naphthyloxy-α-methyl N-acetyl morpholine,
6-fluoro-2-naphthyloxy-α-methyl N-acetyl piperazine,
6-fluoro-2-naphthyloxy-α-methyl N-acetyl-4'-methyl-piperazine are prepared by means of the above process by replacing ammonia with methylamine, dimethylamine, ethylamine, diethylamine, pyrrolidine, piperidine, morpholine, piperazine, and 1-ethyl-piperazine, respectively.

By means of the above process, the corresponding amides of the other 2-naphthyloxyacetoxy acid derivatives made by means described herein are prepared. Accordingly, 6-methyl-2-naphthyloxyacetamide is prepared from 6-methyl-2-naphthyloxyacetic acid.

EXAMPLE 11

To a solution of 26 g. of 6-methoxy-2-naphthyloxy-α-methylacetic acid and 500 ml. of diethyl ether are slowly added a solution comprising of 5.6 g. of diazoethane and 50 ml. of diethyl ether. The reaction mixture is allowed to stand for 15 minutes and then is evapoarted under reduced pressure to yield ethyl 6-methoxy-2-naphthyloxy-α-methylacetate. By replacing diazoethane with diazopropane in the above process, propyl 6-methoxy-2-naphthyloxy-α-methylacetate is obtained.

By means of the above described process, the other 2-naphthyloxyacetic acid derivatives made by the procedures described in the examples herein are esterified.

EXAMPLE 12

A mixture of 32 g. of methyl 6-difluoromethoxy-2-naphthyloxy-α-difluoromethylacetate, 10 g. of sodium methoxide, 14 g. of hydroxyamine hydrochloride, and 500 mg. of methanol are allowed to stand for 16 hours. The mixture is then filtered and evaporated. The residue is neutralized by the addition of aqueous 1 N hydrochloric acid and extracted by ether. The ether solution is then washed with water, dried, and evaporated to afford 6-difluoromethoxy-2-naphthyloxy-α-difluoromethyl acethydroxamic acid.

Similarly, 6-methyl-2-naphthyloxy-α-methyl acethydroxamic is made by means of the above process from methyl 6-methyl-2-naphthyloxy-α-methyl acid.

Similarly, the corresponding hydroxamic acids of the other 2-naphthyloxyacetic acid derivatives prepared via the procedures described in the examples herein are made by means of the above described process.

EXAMPLE 13

To a mixture of 4 g. of sodium hydroxide and 500 ml. of methanol are added 24.6 g. of 6-methoxy-2-naphthyloxy-α-methylacetic acid. The mixture is stirred for 18 hours at 50° C. The cooled mixture is then evaporated to give sodium 6-methoxy-2-naphthyloxy-α-methylacetate.

By employing potassium hydroxide, diethylamine, lysine, caffeine, or procaine in place of sodium hydroxide in the above process, the potassium triethylamine, lysine, caffeine, or procaine salt of 6-methoxy-2-naphthyloxy-α-methylacetic acid is obtained.

By means of the above procedure, the addition salts of the other 2-naphthyloxyacetic acid derivatives made via the procedures described herein are prepared.

In accordance with the methods hereof, the following compounds are prepared:

sodium 2-naphthyloxy-α-methylacetate,
potassium 2-naphthyloxy-α-methylacetate,
methyl-2-naphthyloxy-α-methylacetate,
ethyl 1-chloro-2-naphthyloxy-α-methylacetate,
5-fluoro-2-naphthyloxy-α-methylacetic acid amide,
N,N-dimethyl-6-methyl-2-naphthyloxy-α-methylacetic acid amide,
6-ethyl-2-naphthyloxy-α-methylacetic acid,
6-acetoxy-2-naphthyloxy-α-methylacetic acid,
6-trifluoromethyl-2-naphthyloxy-α-methylacetic acid,
6-difluoromethoxy-2-naphthyloxy-α-methylacetic acid,
6-phenyl-2-naphthyloxy-α-methylacetic acid,
6-ethyl-2-naphthyloxy-α-methylacetic acid,
6-methoxy-2-naphthyloxy-α-methylacetic acid,
6-ethoxy-2-naphthyloxy-α-methylacetic acid,
6-hydroxy-2-naphthyloxy-α-methylacetic acid,
6-difluoromethyl-2-naphthyloxy-α-methylacetic acid, and
6-trichloromethyl-2-naphthyloxy-α-methylacetic acid,
2-naphthyloxy-α-cyclopropylacetic acid,
potassium 2-naphthyloxy-α-cyclohexylacetate,
ethyl 2-naphthyloxy-α-phenylacetate,
1-hydroxy-2-naphthyloxyacetic acid,
4-propionyloxy-2-naphthyloxyacetic acid,
6-tetrahydrofuran-2'-yloxy-2-naphthyloxyacetic acid,
6-tetrahydropyran-2'-yloxy-2-naphthyloxy-α-methylacetic acid,
5-chloro-2-naphthyloxy-α-ethylacetic acid,
N,N-diethyl 6-chloro-2-naphthyloxy-α-methylacetic acid amide,
7-fluoro-2-naphthyloxy-α-butylacetic acid,
methyl 8-methyl-2-naphthyloxy-α-hexylacetate,
potassium 8-methyl-2-naphthyloxy-α-hexylacetate,
6-ethyl-2-naphthyloxy-α-methylacetic acid,
5-isopropyl-2-naphthyloxy-α-methylacehydroxamic acid,
4-trifluoromethyl-2-naphthyloxy-α-methylacetic acid,
3-cyclopentyl-2-naphthyloxy-α-cyclopentylacetic acid,
3-cyclohexyl-2-naphthyloxy-α-cyclopentylacetic acid,
6-difluoromethoxy-2-naphthyloxy-α-methylacetic acid,
1-phenyl-2-naphthyloxy-α-methyl-N-acetylmorpholine, and
6-isopropyloxy-2-naphthyloxy-α-methyl-N-acetyl-morpholine.

What is claimed is:

1. A composition useful for anti-inflammatory, analgesic, anti-pyretic, anti-pruritic, fibrinolytic, and hypocholesterolemic activity which comprises, in a dosage of from about 0.1 to about 60 mg. per kg. of body weight, a compound of the formula:

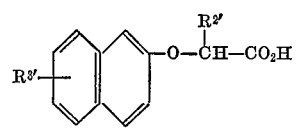

wherein
R$^{2'}$ is lower alkyl, cycloalkyl, or phenyl; and
R$^{3'}$ is lower alkyloxy or haloloweralkyloxy;
the corresponding ester or a pharmaceutically acceptable acid addition salt thereof; and
a pharmaceutically acceptable non-toxic carrier.

2. The composition according to claim 1 wherein the compound is selected from those wherein R$^{2'}$ is lower alkyl and R$^{3'}$ is lower alkyloxy.

3. The composition according to claim 1 wherein the compound is 6 - methoxy - 2-naphthyloxy-α-methylacetic acid of the formula:
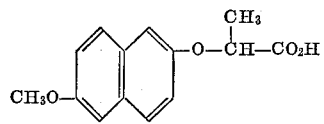
References Cited
UNITED STATES PATENTS
3,328,386   6/1967   Green _____ 260—202
OTHER REFERENCES
Mellor's Modern Inorganic Chemistry, Longmans, Green & Co. (1947), pp. 535, 536.
Pope et al.: Chemical Abstracts, vol. 50 (1956), p. 921.
Sjoberg: Chemical Abstracts, vol. 55 (1961), p. 4356.
STANLEY J. FRIEDMAN, Primary Examiner
U.S. Cl. X.R.
424—248, 250, 267, 274, 283, 285, 308, 311, 324; 260—345.7, 347.4, 473, 476, 479, 520, 559